July 29, 1924.
T. N. WINTER
1,503,181
AUTOMOBILE SPRING
Filed Sept. 25, 1922
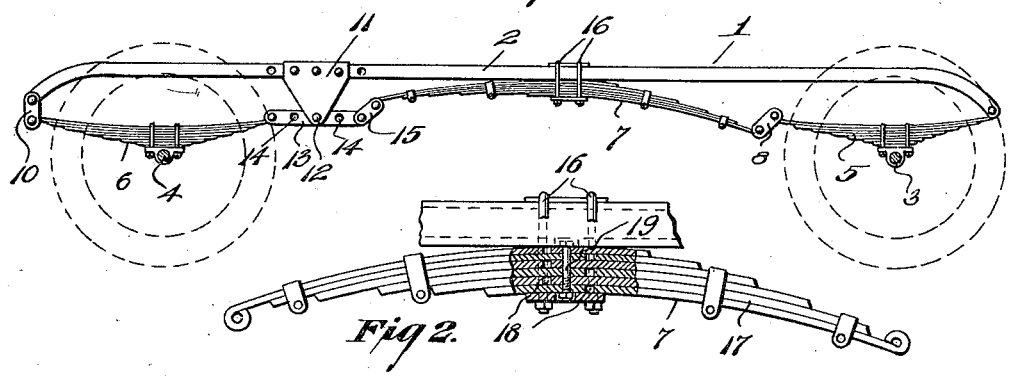
Fig. 1.
Fig. 2.
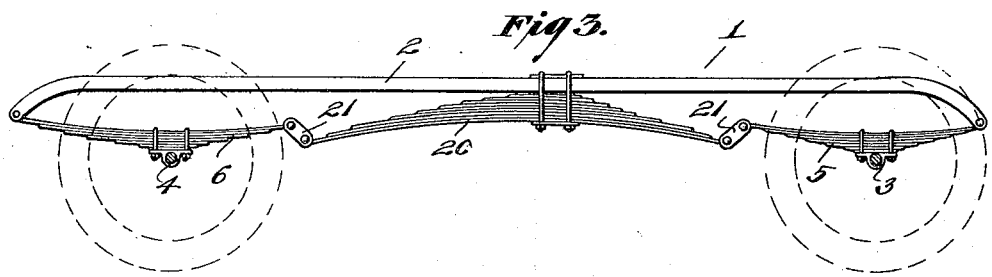
Fig. 3.
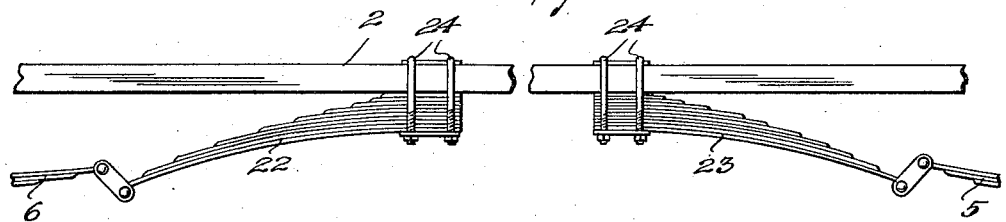
Fig. 4.
Inventor
Thomas N. Winter
By C. C. Shepherd
Attorney Patented July 29, 1924.

1,503,181

UNITED STATES PATENT OFFICE.

THOMAS N. WINTER, OF DELAWARE, OHIO.

AUTOMOBILE SPRING.

Application filed September 25, 1922. Serial No. 590,397.

*To all whom it may concern:*

Be it known that I, THOMAS N. WINTER, a citizen of the United States, residing at Delaware, in the county of Delaware and State of Ohio, have invented certain new and useful Improvements in Automobile Springs, of which the following is a specification.

The present invention is directed to improvements in springs for motor vehicles.

The invention has for its primary object to provide a spring gear for motor vehicles constructed and arranged so that the shocks and jars incident to the wheels coming in contact with road obstructions and transmitted to the chassis and thence to the rear of the body, are reduced to a minimum.

A further object of the invention is to provide a spring gear capable of being applied to frames of different lengths, and further to provide a spring gear which is adjustable in such manner that certain of the spring units may be so adjusted as to regulate the tension thereof.

A still further object of the invention is to provide a spring of this character constructed in such manner that the units thereof are so associated with adjacent units that the rebound of one will be counteracted by the remaining units.

With these and other objects in view, as will appear as the description proceeds, the invention consists in the novel features of construction, combinations of elements and arrangements of parts, and hereinafter to be fully described and pointed out in the appended claims.

In the accompanying drawing:

Figure 1 is a side view of the preferred form of the invention,

Figure 2 is a side elevation partly in section of the center spring unit,

Figure 3 is a side elevation of a slightly modified form of the invention, and

Figure 4 is a fragmentary side elevation showing another modified form of the invention.

Referring to the drawing 1 designates the frame, which includes the usual side sills 2, and since the spring gear upon both sides of the frame are identical in construction and arrangement, the description of one set will suffice for both.

The front and rear axles 3 and 4 have fixed thereto the usual semi-elliptic leaf springs 5 and 6 respectively, the forward ends of the springs 5 being pivotally connected with the forward ends of the sills 2, while the rear ends thereof are pivotally connected to the adjacent ends of the lowermost leaves of the center spring units 7 by shackles 8.

The springs 6 have their rear ends pivotally connected to the rear ends of the sills 2 by shackles 10.

Adjustably mounted on the side sills 2 are brackets 11, said brackets having pivotally connected thereto through the medium of pins 12, levers 13. These levers are provided with a plurality of openings 14 so that said levers may be adjusted longitudinally upon engaging the pins in selected openings. The forward ends of the levers are pivotally connected to the adjacent ends of the uppermost leaves of the spring 7 of shackles 15.

The spring 7 is of the semi-elliptic type, and has its central portions fixed to the sills 2 by U bolts 16. It will be observed that the arrangement of the leaves 17 of the springs 7 are such that they act in reverse directions.

The leaves 17 of the springs 7 are provided with a series of perforations 18 so arranged that the respective leaves may be slid inwardly upon each other to shorten the length of the spring, and in instances where it is desired to place the spring on a comparatively short frame, this is readily accomplished upon bringing the outermost series of perforations in registry to the bolts 19, said bolts being anchored to the sills 2 in any approved manner.

In Figure 1 the bracket 11 is shown in a position for sustaining the body of a vehicle under normal and equally distributed loads. However, when a greater load is supported over the rear of the body as in trucks, the bracket 11 is moved rearwardly and secured, thus changing the fulcrum points of the levers 13 on the pins 12 so that the springs 6 will be stiffened and consequently will sustain a greater load.

In the modified form of the invention as shown in Figure 2 the central spring 20 is of the conventional form and is pivotally connected, by shackles 21 to the springs 5 and 6. In Figure 4 the central spring unit is formed in sections 22 and 23 which are secured to the sills 2 by U bolts 24. This spring unit is sectionalized so that it will not be necessary to provide a spring of great length and weight on a vehicle having a comparatively long frame.

It will be observed that a vehicle equipped with the spring gear as described, when travelling over obstructions, will cause the levers 13 to rock, and as the rear end of the levers move upwardly the forward ends will consequently move downwardly thus transmitting the shock from one spring unit to the other. It will be of course apparent that when the forward ends of the levers swing downwardly that the adjacent portions of the spring units 7 will be flexed downwardly so as to absorb the shocks and greatly improve the riding qualities of the vehicle so equipped.

What is claimed is:

1. The combination with a vehicle frame and its associated front and rear axles, of springs supported upon the axles and having their outer ends pivotally connected with the sills of the frame, central springs fixed to the frames, the leaves of the central springs being overlapped capable of relative adjustment longitudinally, said central springs being pivotally connected with the adjacent ends of the axle supported springs.

2. The combination with a vehicle frame and its associated front and rear axles, of leaf springs supported on the axles and having their outer ends pivotally connected with the frame, central leaf springs fixed to the frame, the forward ends of the central springs being pivotally connected with the springs of the front axles, levers pivotally connecting the rear ends of the central springs and adjacent ends of the rear axle supported springs, and means for pivotally and adjustably connecting the levers with the frame.

3. The combination with a vehicle frame, of front and rear leaf springs having their outer ends pivotally connected with the frame, central leaf springs fixed to the frame and having their leaves adjustable longitudinally with respect to each other, the forward ends of the central springs being pivotally connected with the front springs, brackets adjustably carried by the frame, levers pivotally and adjustably supported by the brackets and having their ends pivotally connected respectively with the rear ends of the central springs and the forward ends of the rear springs, as and for the purpose set forth.

In testimony whereof I affix my signature.

THOMAS N. WINTER.